United States Patent
Embree et al.

[15] 3,648,170
[45] Mar. 7, 1972

[54] MEASUREMENT OF FIELD EFFECT TRANSISTOR PINCH-OFF VOLTAGE

[72] Inventors: Milton L. Embree, Laureldale; William R. Huber, III, Reading, both of Pa.

[73] Assignee: Bell Telephone Laboratories, Incorporated, Murray Hill, N.J.

[22] Filed: Aug. 8, 1969

[21] Appl. No.: 848,444

[52] U.S. Cl.............................................324/158 T, 307/304
[51] Int. Cl..............................................................G01r 31/22
[58] Field of Search.................324/158 T, 158, 20 R, 20 CR, 324/21, 22, 23, 24, 25, 26, 27; 307/205, 304

[56] References Cited

UNITED STATES PATENTS 3,486,821  12/1969  Westhaver.........................307/304 X
2,872,645   2/1959  Santamaria et al....................324/158

*Primary Examiner*—Rudolph V. Rolinec
*Assistant Examiner*—Ernest F. Karlsen
*Attorney*—R. J. Guenther and Edwin B. Cave

[57] ABSTRACT

A test circuit for determining the pinch-off voltage of a field effect transistor comprises, in series, a source of unidirectional voltage of a magnitude greater than the expected pinch-off voltage and less than the breakdown voltage, the source and drain electrodes respectively of the field effect transistor under test, and a resistance element of relatively large magnitude, typically, at least one megohm. The gate electrode is grounded and observation of the voltage drop across the resistance element gives a reading differing from theoretical pinch-off voltage by only a small percentage.

8 Claims, 3 Drawing Figures

Patented March 7, 1972

3,648,170

INVENTORS M.L. EMBREE
W.R. HUBER, III
BY H.W. Lockhart
ATTORNEY

MEASUREMENT OF FIELD EFFECT TRANSISTOR PINCH-OFF VOLTAGE

BACKGROUND OF THE INVENTION

This invention relates to a technique for determining the pinch-off voltage of a field effect transistor.

In field effect transistors penetration of the entire channel by the space charge region is referred to as pinch-off and the magnitude of the reverse bias, gate-to-channel, to achieve this condition is the pinch-off voltage. The pinch-off voltage is a useful parameter for characterizing a field effect transistor. However, measurement of pinch-off voltage has been difficult because the most common method of measurement has involved the adjustment of the gate-to-source voltage until a selected small value of drain current is achieved. In automatic measurement systems, this interaction of drain current and gate-to-source voltage requires the use of complicated detection and feedback control systems. Moreover, pinch-off, represented by the onset of zero drain current, is never attained in practical devices because of reverse bias junction leakage currents.

Accordingly, various standards and methods have been proposed and are used for determining the pinch-off voltage of a field effect transistor. In accordance with one widely used standard, the gate-to-source voltage necessary to limit drain current to some arbitrarily small value, such as 1 or 0.1 microamperes, has been defined as pinch-off voltage. However, using either this approach or others which seek to detect the reverse bias voltage at or close to pinch-off, relatively complex circuit arrangements are required utilizing feedback and including operational amplifiers. Manually operated arrangements generally entail some operator skill to achieve a reasonably useful answer.

BRIEF SUMMARY OF THE INVENTION

However, in accordance with this invention a relatively simple circuit configuration utilizing a relatively large resistance element in series with the field effect transistor under test tends to drive the field effect transistor close to the pinch-off condition and thus to enable observation of a gate-to-source voltage at a very low drain current, which voltage is determined to depart from the theoretical pinch-off voltage by only a very small percentage. Accordingly, in lieu of relatively complex test apparatus in which it is attempted to provide drain current at a previously defined value and then to measure the gate-to-source voltage under this condition, a simple circuit is provided in which the transistor may be inserted, and, using a given voltage and a given resistance element, observation of the voltage drop across the resistance element corresponds within close limits to the theoretical pinch-off voltage.

BRIEF DESCRIPTION OF THE DRAWINGS

The invention, its objects and features, may be better understood from the following detailed description taken in conjunction with the drawing in which.

DETAILED DESCRIPTION

Figure 1:
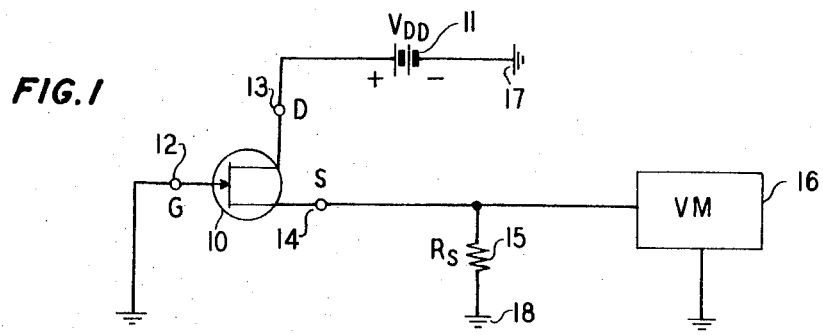
FIG. 1 is a circuit schematic of a basic form of the test circuit.

Referring to FIG. 1, a test circuit is shown comprising a field effect transistor 10, under test, having in series circuit arrangement, drain electrode 13 and source electrode 14, a unidirectional voltage source 11 ($V_{DD}$) connected to the drain electrode 13 and a resistance element 15 ($R_S$), of about 10 megohms and typically at least one megohm, connected to the source electrode 14. The termination points 17 and 18 of this series configuration are both connected to ground. The gate electrode 12 of the transistor 10 likewise is connected to ground and a high impedance DC voltmeter 16 is provided in parallel with the resistance element for observing the voltage drop thereacross.

In practice, for most field effect transistors of the type utilized in small signal applications, the unidirectional voltage source 11 is set at a value, for example 20 volts, which is below the breakdown voltage of the transistor and above the expected pinch-off voltage. The resistance element 15 ($R_S$), as mentioned above, is of a relatively large value, about 10 megohms, or sufficient to insure a drain current of less than 1 microampere. In operation, using this circuit it is necessary only to insert the field effect transistor 10, under test, into the circuit either as a discrete device or by applying probes to a field effect transistor in an integrated circuit and then to observe the voltage drop across the resistance element 15 ($R_S$). The source terminal 14 of the field effect transistor is forced to a value near the pinch-off voltage by the IR drop resulting from the drain current flowing through the large resistor 14 ($R_S$). When more drain current flows the voltage drop across the resistor increases moving the device back toward pinch-off voltage.

The accuracy and usefulness of the technique in accordance with this invention compared with other measurement techniques and the theoretical pinch-off value is demonstrated by the following evaluation in which:

$I_{DSS}$ is the drain current for zero gate-to-source voltage;

$V_{GS}$ is the gate-to-source voltage;

$I_D$ is the drain current for a gate-to-source voltage $V_{GS}$;

$W_0$ is the theoretical value of pinch-off voltage;

$V_P$ is the value of pinch-off voltage as measured by previous techniques at arbitrary values of drain current;

$E_P$ is the value of pinch-off voltage measured in accordance with this invention.

The following well-known expression closely approximates the characteristics of a diffused junction field-effect transistor:

$$I_D/I_{DSS} = [1 - (V_{GS}/W_0)]^2. \quad (1)$$

Rearranging, Equation (1) may be written $$V_{GS}/W_0 = 1 - (I_D/I_{DSS})^{1/2}. \quad (2)$$

From Equation (2), for a given value of $I_D/I_{DSS}$, then $V_{GS}$ will be a constant percentage of $W_0$. For example, if, in accordance with one prior art measuring method, as specified by the Joint Electron Device Engineering Council (JEDEC), $V_{GS}$ is defined as $V_P$ when $I_D/I_{DSS} = 1/1,000$, then $$V_P/W_0 = 1 - [1/1,000^{1/2}] = 0.9684. \quad (3)$$

The value of $V_P$ as thus measured will be 3.16 percent less than $W_0$. If $I_D/I_{DSS}$ is taken as 1/100 then this difference increases to 10 percent.

However, in the method in accordance with this invention, $$I_D = V_{GS}/R_S. \quad (4)$$

Eliminating $I_D$ between Equations (1) and (4) gives $$\frac{V_{GS}}{W_0} = 1 + \frac{W_0}{2I_{DSS}R_S}\left[1 - \sqrt{1 + \frac{4I_{DSS}R_S}{W_0}}\right]. \quad (5)$$

Then defining $E_P$ equal to $V_{GS}$, $$\frac{E_P}{W_0} = 1 + \frac{W_0}{2I_{DSS}R_S}\left[1 - \sqrt{1 + \frac{4I_{DSS}R_S}{W_0}}\right]. \quad (6)$$

Figure 2:
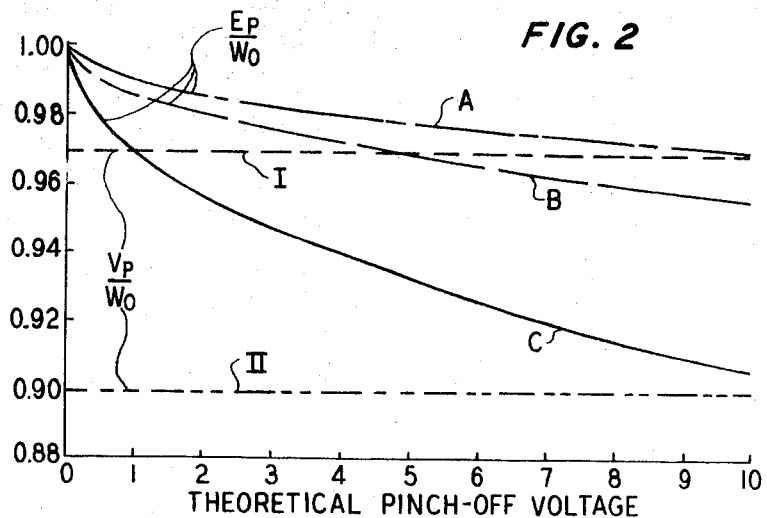
FIGS. 2 and 3 are graphs depicting the improved results achieved by the method in accordance with this invention.

This equation is plotted in FIG. 2 with theoretical pinch-off voltage, $W_0$, in volts as abscissa and the ratio of observed, $E_P$, to theoretical, $W_0$, pinch-off voltage as ordinate. It can be seen that as the term $I_{DSS}R_S$ increases in magnitude, $E_P/W_0$ approaches unity and therefore that $E_P$ approaches $W_0$. Curve A defines $E_P/W_0$ when the term $I_{DSS}R_S$ has the value $10^4$. Curve B expresses the relationship when $I_{DSS}R_S$ equals $5 \times 10^3$, and Curve C when the value is $10^3$. Line I and Line II depict the deviation from theoretical pinch-off, under the prior art method previously pointed out when $I_D/I_{DSS} = 1/1,000$ and $I_D/I_{DSS} = 1/100$, respectively, plotted versus $$(V_P/W_0).$$

From the foregoing discussion and particularly from Curve A of FIG. 2, the method of this invention yields results within about 3 percent of the theoretical pinch-off voltage for a large range of pinch-off voltages. Curve A represents an $I_{DSS}R_S$ product of $10^4$. For an FET having a typical $I_{DSS}$ of 1 ma., the corresponding $R_S$ would be 10 megohms.

Accordingly, it is evident that this measurement technique involving the use of a resistance element of at least one megohm and typically about 10 megohms for presently available field effect transistors is advantageous. However, in the event of field effect transistors having much larger values of drain current at zero gate-to-source voltage ($I_{DSS}$) somewhat lower values of resistance ($R_S$) may be used. Hence, it is useful to define the circuit parameters in terms of the $I_{DSS}R_S$ product in which case it can be stated that resistance element should have a magnitude such that, for the transistor under test, the product $I_{DSS}R_S$ should be at least $1 \times 10^3$ volts and typically be about $1 \times 10^4$ volts.

Figure 3:
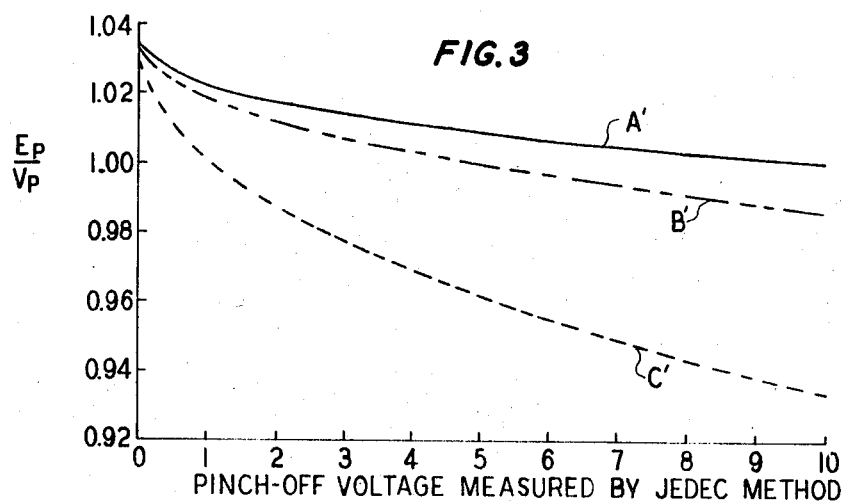

To make explicit the comparison between the values observed from the measuring system in accordance with this invention and those of prior art methods the curves of the graph in FIG. 2 have been replotted in FIG. 3 to show $E_P/V_P$ as ordinate and $V_P$ as abscissa for various values of the term $I_{DSS}R_S$, Curves A′, B′ and C′ corresponding to A, B and C, respectively, of FIG. 2. A consideration of FIG. 3 enables the following observations. If, for a given device, the probable pinch-off voltage range and zero-gate-bias drain current range are known, the value of $R_S$ can be optimized to yield values of $E_P$ very close to the value of $V_P$ as defined by the more complex prior art methods. Also, for a pinch-off voltage range from 2.5 to 8.5 volts a value of $R_S$ such that $I_{DSS}R_S$ is about $5 \times 10^3$ will yield values within $\pm 1$ percent of $V_P$. Further, for a given field effect transistor geometry, $I_{DSS}$ and $V_P$ tend to increase together. Therefore, for high $V_P$ devices, $I_{DSS}R_S$ tends to be higher than the nominal value, thus decreasing the difference between $E_P$ and $V_P$. This same effect tends to improve measurement accuracy on devices with $V_P$ values below the nominals.

In one typical example testing a Western Electric 61A junction field effect transistor the following parameters were observed:

$V_{DD}$—15 v.
$I_{DSS}$—3.80 ma.
$I_D$—0.3654 microamp
$R_S$—10 Megohms
$E_P$—3.654 v.
$V_P$—3.678 v. (measured at $I_D$=100 nanoamps).

It will be appreciated by those skilled in the art that the foregoing described measurement technique may be used not only with junction field effect transistors but advantageously also with insulated gate field effect transistors of the depletion-mode type.

What is claimed is:

1. The method of determining the pinch-off voltage of a field effect transistor having source and drain electrodes defining a channel therebetween and a gate electrode juxtaposed to said channel, comprising the steps of
   a. applying to the drain electrode a unidirectional voltage source poled to bias said channel toward pinch-off and having a magnitude greater than the expected pinch-off voltage and less than the breakdown voltage of the transistor being tested
   b. connecting the gate electrode to ground,
   c. connecting the source electrode to a resistance element having a resistance of at least one megohm,
   d. and observing the voltage drop across said resistance element.

2. The method in accordance with claim 1 in which said source electrode is connected to a resistance element having a resistance of a magnitude such that, for the transistor under test, the $I_{DSS}R_S$ product is at least $1 \times 10^3$ volts.

3. The method in accordance with claim 1 in which said resistance element has a resistance of about 10 megohms.

4. The method in accordance with claim 1 in which said resistance element has a resistance of a magnitude such that, for the transistor under test, the $I_{DSS}R_S$ product has a value of about $1 \times 10^4$ volts.

5. A circuit for determining the pinch-off voltage of a field-effect transistor, said circuit comprising a field effect transistor under test, said transistor having source and drain electrodes and a channel therebetween, and a gate electrode juxtaposed to said channel, a unidirectional voltage source having a magnitude less than the breakdown voltage and greater than the expected pinch-off voltage of the transistor under test connected to said drain electrode and poled to bias said channel toward pinch-off, a resistance element connected to said source electrode having a resistance of at least 1 megohm, means connecting said gate electrode to ground, and high impedance means for observing the voltage drop across said resistance element.

6. A circuit in accordance with claim 5 in which said resistance element has a resistance of a magnitude such that, for the transistor under test, the $I_{DSS}R_S$ product has a value of at least $1 \times 10^3$ volts.

7. A circuit in accordance with claim 5 in which said resistance element has a resistance of a magnitude of about 10 megohms.

8. A circuit in accordance with claim 5 in which said resistance element has a resistance of a magnitude such that, for the transistor under test, the $I_{DSS}R_S$ product has a value of about $1 \times 10^4$ volts.

* * * * *